Oct. 25, 1938.  A. C. SECOR  2,134,210
MACHINE FOR FINISHING SPHERICAL SURFACES
Filed Nov. 14, 1935  3 Sheets-Sheet 1

INVENTOR.
Allen C. Secor
BY
E. Archer Turner
ATTORNEY.

INVENTOR.
Allen C. Secor
BY
E. Archer Turner
ATTORNEY.

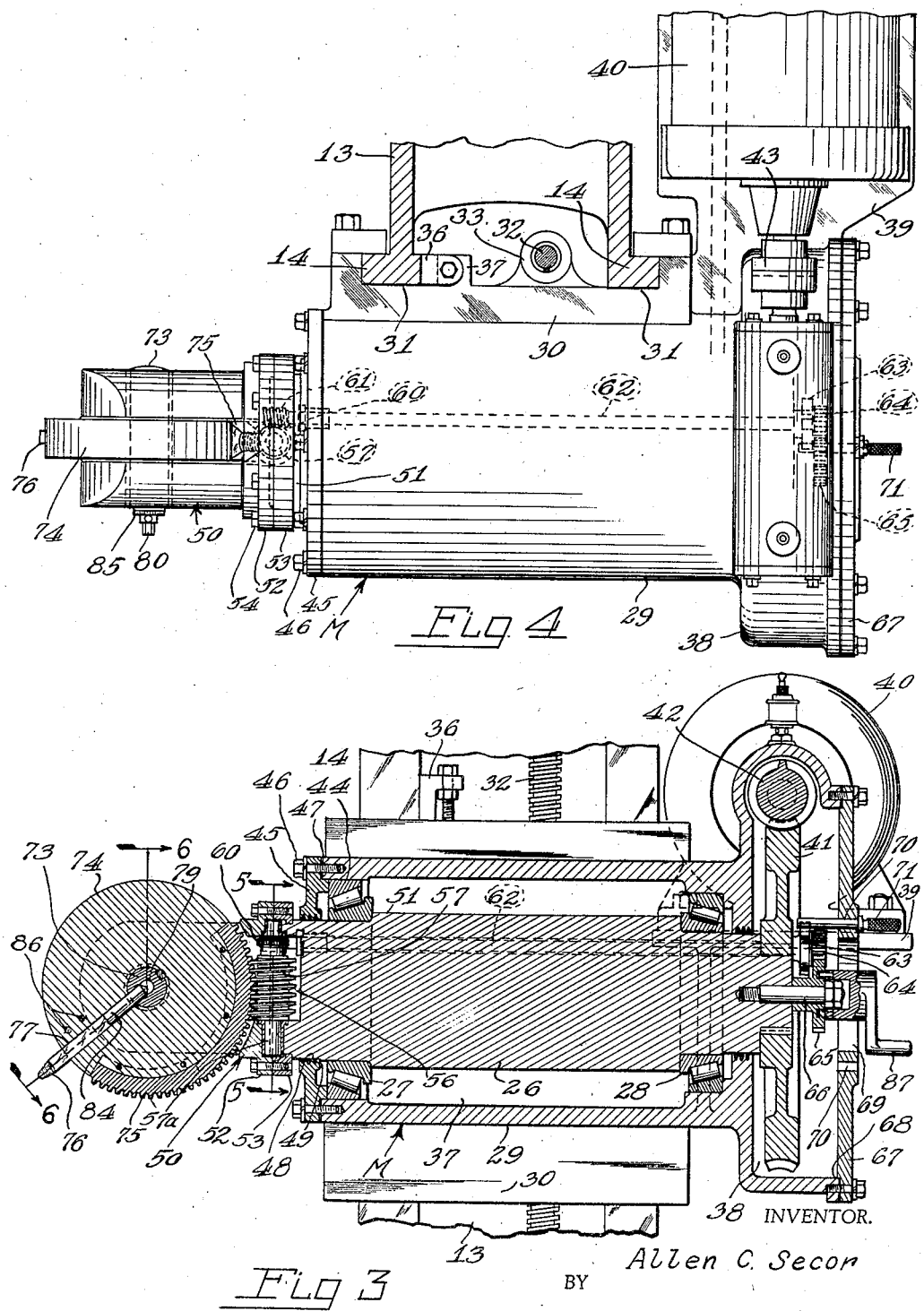

Patented Oct. 25, 1938

2,134,210

UNITED STATES PATENT OFFICE 2,134,210

MACHINE FOR FINISHING SPHERICAL SURFACES

Allen C. Secor, Erie, Pa., assignor, by mesne assignments, to The Standard Stoker Company, Inc. (1922), New York, N. Y., a corporation of Delaware Application November 14, 1935, Serial No. 49,664

8 Claims. (Cl. 77—3)

This invention relates to machines for finishing spherical surfaces.

In the use of universally connected conduits for conveying material it is desirable, in order to prevent leakage of material at the universal connection between the conduits, that the mating parts of the universal connection be fitted accurately. Since it is impossible to cast these parts with sufficient accuracy to attain this desired end, the machining of the parts has been considered. However, the heretofore known methods of machining spherical surfaces all require unusual care on the part of highly skilled machinists who must constantly check each cut and advance of the tool. Furthermore, the finished surface is usually not of true spherical form and requires the use of templates to check successive points along the spherical surface. Machining of spherical surfaces in stoker conduits is made especially difficult by reason of the fact that the spherical seat is usually at one end of a long tube; other features in the design and construction of stoker conduits preclude the use of through boring bars or the rotation of the conduit about the cutting tool, making difficult machining of spherical surfaces even by methods heretofore employed.

Accordingly, it is the general object of the invention to provide a device for finishing spherical surfaces such as those of ball joint connections commonly found on conduits in all sorts of uses, and especially in instances where the spherical seat is at one end of a relatively long tube as in flexible stoker conduits and pipe line connections.

More specifically, an object of the invention is the provision of means for machining the interior of a spherical ball joint seat of a stoker conduit wherein the ball seat is adapted to receive a conduit having an axis which is angular with respect to the axis of the first named conduit. The present invention also contemplates the provision of a machine for the purpose specified and wherein the center of the spherical ball seat is at one side of the axis of the conduit.

It is also an object of this invention to provide a machine for the purpose specified and wherein the plane of the free end of the spherical ball seat is not perpendicular to the axis of the conduit.

Another object of the invention is the provision of a tool head which is pivotally related with the driving spindle of a machine so that it may be rotated about its pivot as it rotates about the axis of the spindle.

A further object of the invention is the provision of a pivoted tool head which is capable of rotation in a plane parallel to the axis of the spindle as the spindle causes it to rotate in a plane parallel to the axis of its pivot.

A still further object of the invention is the provision of novel feed mechanism for rotating the tool head by the rotation of the spindle or by manual means.

To the above and other ends which will hereinafter appear, this invention consists in the features of construction, and combinations and arrangements of parts hereinafter described and particularly pointed out in the claims.

Referring now to the drawings,—

Fig. 3 is a sectional view of part of the machine taken on the vertical line 3—3 of Fig. 2;

Fig. 4 is a plan view of the mechanism shown in Fig. 3;

Fig. 6 is an enlarged sectional view taken on the irregular line 6—6 of Fig. 3.

Figure 1:
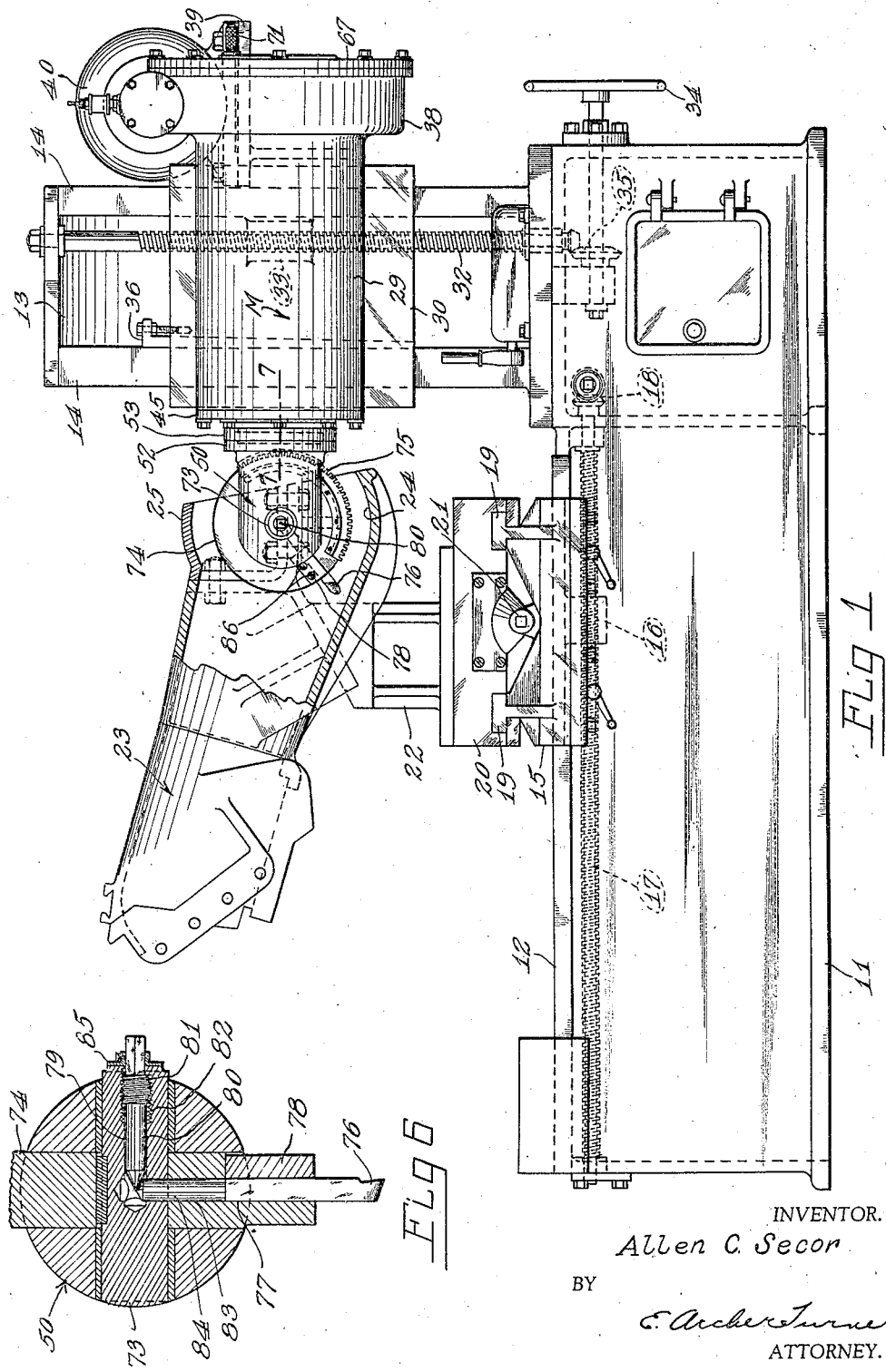
Fig. 1 is an elevational view of the machine, on which a casting to be bored is shown, with some parts thereof broken away.
Figure 2:
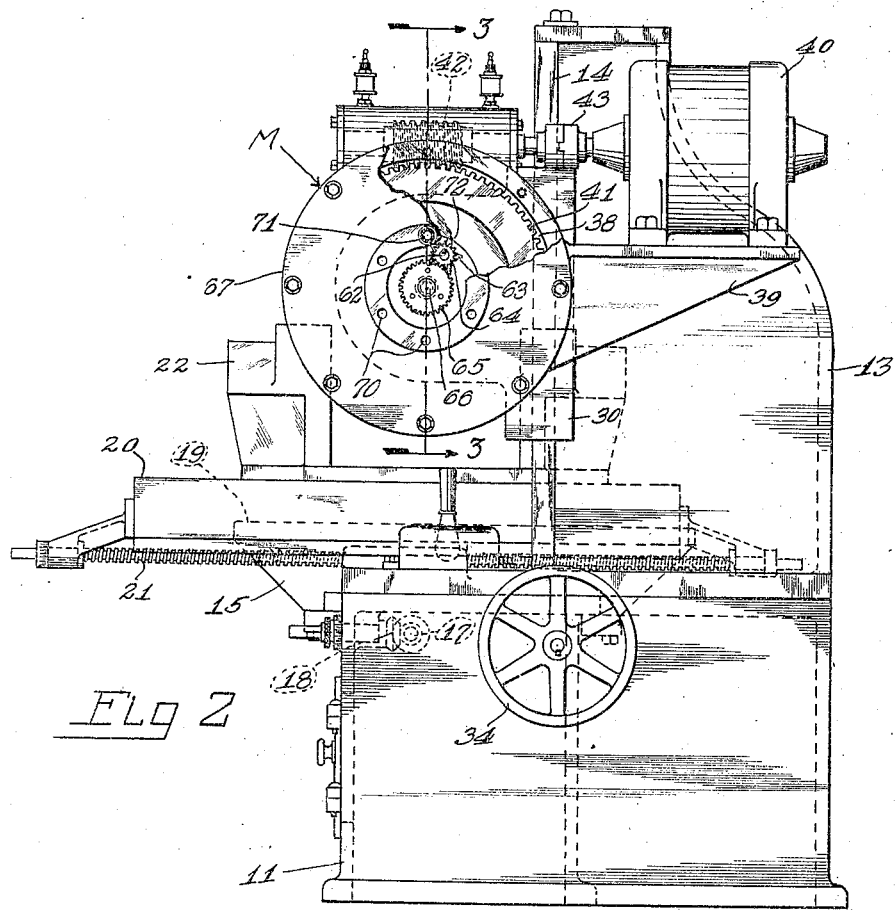
Fig. 2 is an elevational view of one end of the machine.
Figures 5, 7:
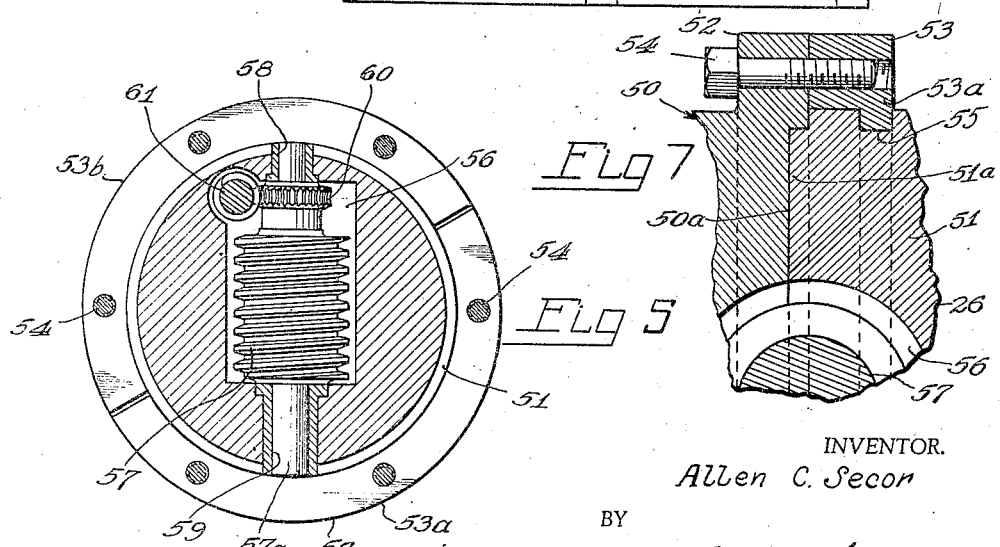
Fig. 5 is an enlarged sectional view taken on the line 5—5 of Fig. 3.
Fig. 7 is an enlarged fragmentary sectional view taken on the line 7—7 of Fig. 1.

Referring now to the drawings the machine embodying my improvements comprises the bed 11 provided on its upper side with the horizontal ways 12. At one end of the bed there is an upright housing 13 having the vertical ways 14. Mounted on the horizontal ways 12 is a carriage 15 which has an extension 16 on its under side engaging the horizontal adjusting screw 17 journaled in the bed and arranged to be rotated in the usual manner through gearing 18. The carriage 15 on its upper side is provided with guide ways 19 which are disposed transversely with respect to the ways 12 and carry the table 20 adjustable transversely of the bed by means of the screw 21 and an arrangement of parts substantially as described in connection with the horizontal adjusting screw 17.

A jig 22 is mounted on the upper surface of the table 20, the jig rigidly carrying the article to be machined which in this instance is a stoker conduit 23. At one end of the stoker conduit there is a spherical seat 24 adapted to receive a complementary spherical ball of another conduit which is universally connected thereto by means of a spherical clamp 25.

The principal feature of the machine is the mechanism for machining spherical surfaces. This mechanism is generally indicated at M and comprises a spindle 26 which is supported on the roller bearings 27, 28 carried by the housing 29. At one side, the housing 29 is provided with a saddle 30 having guides 31 which are adapted to engage the vertical ways 14 of the upright housing 13. As heretofore described in connection with the horizontal adjusting screw 17, similar means are provided for vertically adjusting the position of the spindle 26 of the mechanism M. This means includes an upright lead screw 32 which is engaged by the extension lug 33 of the saddle 30 and which lead screw is manually rotated by means of a handwheel 34 and the gearing 35. To prevent movement of the spindle 26 longitudinally with respect to the bed 11 and also for the purpose of maintaining the spindle and its housing true on the vertical ways 14 of the upright housing 13, a gib 36 is inserted between one of the ways 14 and the rib 37 which projects from the saddle 30.

The housing 29 includes a cylindrical portion 37 within which is disposed the spindle 26. At one end, the cylindrical portion is provided with a gear case 38 and a support bracket 39 on which is mounted the motor 40 constituting the motive power for the spindle mechanism M. One end of the spindle 26 extends into the gear case 38 and has keyed thereto a worm gear 41 which meshes with a worm 42 operatively connected by the coupling 43 (Fig. 4) to the motor 40. Remote from the gear case 38, the cylindrical portion 37 of the housing 29 is provided with an opening 44 through which the spindle 26 is inserted and mounted in its operative relation in the housing. A cover 45 fits over the opening 44 and is secured to the cylindrical portion of the housing by bolts 46. Between the adjacent faces of the housing and cover 45, gaskets or shims 47 are interposed to provide means for proper adjustment of the bearings 27, 28 and a seal for the lubricant used in the spindle housing 29.

The spindle 26 projects outwardly beyond the cover 45 through the central aperture 48 thereof, additional oil seals 49 being provided, as shown in Fig. 3. At its free end, the spindle 26 is provided with the bifurcated hub member 50 which is made separate from the journaled portion 51 of the spindle. A flange 52 is formed at the end of the bifurcated member 50 adjacent the journaled portion 51 of the spindle and this flange is in abutting relation with a flange 53 carried by the adjacent end of the journaled portion 51. Bolts 54 firmly secure the flanges 52, 53 in their abutting relation. In order to facilitate assembly of the cover 45 and the bearing 27, the flange 53 is in the form of a pair of semi-circular rings 53a, 53b which are seated in a circumferential groove 55 formed in the journaled portion 51 of the spindle 26. In order that the bifurcated member 50 and the journaled portion 51 of the spindle may be accurately aligned, the former is provided with an accurately finished master bore 50a into which is accurately fitted the ring 51a of the journaled portion 51.

A recess 56 is formed at the juncture of the bifurcated member 50 and the journaled portion 51. In this recess 56, a worm 57 is mounted so that its axis lies in the plane of the abutting flanges 52, 53. The ends of the worm shaft 57a are suitably journaled in bearings 58, 59 each of which is carried partially by the bifurcated member 50 and the journaled portion 51 of the spindle 26. Thus, the journaling of the worm shaft 57a and the attachment of the abutting flanges 52, 53 forms in effect a driving connection between the journaled portion 51 and the bifurcated member 50 of the spindle 26.

Between the bearing 58 and the worm 57, the worm shaft 57a carries a worm gear 60 which is meshed with a worm 61 mounted on a shaft 62, the axis of which is at one side of and parallel to the axis of the spindle 26. Preferably, the shaft 62 passes through the spindle 26 and is suitably journaled therein. The end of the shaft 62 remote from the worm 61 passes through the large worm gear 41 and carries a cam 63 which in this instance is in the form of a five pointed star. Beyond the cam 63, a spur gear 64 is fixed to the shaft 62 and meshes with another spur gear 65 which is loosely mounted on a stub shaft 66 coaxially carried by the spindle 26. A cover 67 fits over the opening 68 in the gear case 38 and is provided with a central aperture 69 at a sufficient height above the oil level in the gear case to prevent loss of lubricant when the worm gear 41 rotates in the oil bath. A plurality of equally spaced holes 70 are drilled through the cover 67 for receiving a feed control pin 71, the inner end of which is arranged to fit between the arms 72 of the star cam 63, for the purpose to be hereinafter more fully explained.

The bifurcated member 50 pivotally carries a pin 73, the axis of which intersects the spindle axis at right angles. Between the bifurcated ends of the member 50, the pin 73 has keyed thereto the tool head 74, the latter having fastened thereto a worm gear sector 75 which meshes with the worm 57. A cutting tool 76 extends radially from the head 74 and is clamped in the groove 77 by means of the plate 78. Means are provided for radially adjusting the cutting tool 76. For this purpose, the pivot pin 73 is drilled axially as at 79 to receive a pin 80 which is threaded as at 81 into the threaded portion 82 of the axial drill hole 79. Immediately back of the tool groove 77, the head 74 is drilled as at 83 in a manner to intersect the drill hole 79 of the pivot pin 73 at right angles. A pin 84 within the drill hole 83 abuts the inner end of the tool 76 and at its opposite end is provided with a conical end arranged to contact the conical end of the pin 80. The outer end of the pin 80 extends beyond the body of the bifurcated member and is polygonal in shape so that it may be turned by a suitable wrench. If desired, a calibrated disc 85 may be employed to micrometrically indicate the outward position of the tool 76 when the pin 80 is screwed inwardly or outwardly.

Whenever a spherical surface is to be machined, such as the ball seat 24 of the stoker conduit 23, the machinist first loosens the screws 86 which hold the plate 78 tightly over the tool 76. The pin 80 is then turned in a direction so that the cutting tool 76 may be at the desired radius from the axis of the pivot pin 73. This radius corresponds to the radius of spherical curvature at which the ball seat 24 is to be machined. The screws 86 are tightened and the machinist then adjusts the stoker conduit 23 and the tool head 74 so that the intersection of the axis of the pivot pin 73 with the axis of the spindle 26 will coincide with the center of the spherical ball seat 24 of the stoker conduit. This adjustment is readily accomplished by the screw adjusting means of the carriage 15, the table 20 and the spindle mechanism M. Having accurately centered the spherical seat 24 in relation to the cutting tool 76, the machine operator engages a crank 87 with the spur gear 65 (Fig. 3) and rotates the same in a direction whereby the cutting edge of the tool 76 may be positioned closely adjacent the stock first to be removed from the spherical seat 24. It will be apparent that this manual positioning of the tool 76 is accomplished by rotating the meshing spur gears 64, 65 which causes rotation of the shaft 62 in the spindle 26 to move the tool head 74 about the pivot pin 73 by reason of the double reduction worm gearing carried adjacent the bifurcated member 50 of the spindle 26. When the tool 76 is being positioned manually, the feed control pin 71 should be removed from its position between the arms of the star cam 63.

Upon proper positioning of the cutting tool 76, the drive motor may then be started, whereupon the spindle 26 and the tool head 74 will be rotated on the axis of the spindle by the worm gearing 41, 42. However, the cutting tool 76 will make no advance from its manually set position until the feed mechanism is set into operation. This is accomplished by inserting the feed control pin 71 into any one of the equally spaced holes 70 in the cover 67 and pushing the pin inwardly into the path of the arms 72 of the star cam 63. As the worm gear 41 rotates, it will be apparent that the shaft 62 and the star cam 63 which is fixed thereto, will constantly revolve about the axis of the spindle 26. When an arm 72 of the star cam 63 comes in contact with the feed control pin 71, the continued revolving motion of the star cam 63 about the axis of the spindle will partially rotate the star cam and shaft 62 in a direction counter to that of the worm gear 41. It will be understood that the degree of partial rotation of the cam 63 and shaft 62 is determined by the shape and relation of the arms 72 and that the rotation of the cam and shaft 62 will continue so long as an arm 72 is in contact with the feed control pin 71. Upon passage of an arm 72 out of the range of the pin 71, rotation of the shaft 62 will be interrupted.

Partial rotation of the shaft 62 in the manner above described will be transmitted to the tool head 74 by means of the worm gearing adjacent the bifurcated member 50 of the spindle 26, causing the tool head to rotate slightly about the pivot pin 73 during axial movement of the spindle. This slight rotary movement of the head 74 will cause the tool 76 to advance for removing the stock from the spherical ball seat 24. Successive engagement of a cam arm 72 with the feed control pin 71 will cause successive advancing movement of the cutting tool during axial movement of the spindle 26. If it is desired to increase the rate of tool advancement, several of the holes 70 may each be provided with a feed pin such as 71 so that partial rotation of the star cam 63 and shaft 62 will occur several times during each rotation of the spindle 26. It will also be understood by those familiar with machine shop practice that the feed control pins if used plurally should be in such multiples as will result in tool advances at equal intervals during one complete rotation of the spindle 26. Thus, when six equally spaced holes are used, such as in the illustrated construction, the plural use of the feed control pins should be in multiples of two, three or six, spacing them at 180 degrees, 120 degrees, or 60 degrees apart, respectively, so that the advancement of the tool 76 will occur at the spaced intervals.

From the foregoing, it will be apparent that the machine of my invention will effectively finish spherical surfaces in a manner which is automatic in operation and whereby a spherical surface is quickly and more accurately machined.

I claim:

1. In combination, a spindle mechanism of the character described comprising a housing provided with bearings adjacent its ends, a spindle rotatably mounted in said bearings and having one end bifurcated, a tool head pivotally supported by the forks of said spindle, mechanism for rotating the tool head including a gear mounted on the end of said spindle remote from said tool head, a case for said gear, a cover for said case provided with an aperture, a feed control pin for said aperture, gearing associated with said pin and said tool head including a star wheel pivotally mounted on the spindle within the gear case for automatically rotating said tool head about its pivot, and manually operable means extending exteriorly of said case arranged to rotate said tool head about its pivot independent of the rotation of said spindle.

2. In combination, a spindle mechanism of the character described comprising a spindle arranged for rotation about its axis, said spindle including a free end, an attachment flange on the free end of said spindle fixed with reference to movement longitudinally thereof, a member at the free end of said spindle in abutting relation therewith in a plane disposed transversely to the axis of said spindle, means for securing said member to said flange and arranged to restrain movement between said member and said flange longitudinally of said spindle, a shaft journaled partly in said spindle and partly in said member forming a driving connection therebetween, the axis of said shaft lying in the aforesaid plane transversely to the axis of said spindle, a tool head supported by said member, and means operatively connecting said shaft and said tool head.

3. In combination, a spindle mechanism of the character described comprising a spindle arranged for rotation about its axis, said spindle including a free end, an attachment flange on the free end of said spindle fixed with reference to movement longitudinally thereof, a member at the free end of said spindle in abutting relation therewith in a plane disposed transversely to the axis of said spindle, means for securing said member to said flange and arranged to restrain movement between said member and said flange longitudinally of said spindle, a shaft journaled partly in said spindle and partly in said member forming a driving connection therebetween, the axis of said shaft lying in the aforesaid plane transversely to the axis of said spindle, a tool head supported by said member, and gearing operatively connecting said shaft and said tool head.

4. In combination, a spindle mechanism of the character described comprising a spindle arranged for rotation about its axis, said spindle including a free end, an attachment flange on the free end of said spindle fixed with reference to movement longitudinally thereof, a member at the free end of said spindle in abutting relation therewith in a plane disposed transversely to the axis of said spindle, means for securing said member to said flange and arranged to restrain movement between said member and said flange longitudinally of said spindle, a shaft journaled partly in said spindle and partly in said member forming a driving connection therebetween, the axis of said shaft lying in the aforesaid plane transversely to the axis of said spindle, a tool head supported by said member, gearing operatively connecting said shaft and said tool head, and means for restraining movement of said shaft about its axis during rotation of said spindle.

5. In combination, a spindle mechanism of the character described comprising a spindle arranged for rotation about its axis, said spindle including a free end, an attachment flange on the free end of said spindle fixed with reference to movement longitudinally thereof, a member at the free end of said spindle in abutting relation therewith in a plane disposed perpendicularly to the axis of said spindle, means for securing said member to said flange and arranged to restrain movement between said member and said flange longitudinally of said spindle, a shaft journaled partly in said spindle and partly in said member forming a driving connection therebetween, the axis of said shaft lying in the aforesaid plane disposed perpendicularly to the axis of said spindle, a tool head supported by said member, and means operatively connecting said shaft and said tool head.

6. In combination, a spindle mechanism of the character described comprising a spindle arranged for rotation about its axis, said spindle including a free end, an attachment flange on the free end of said spindle fixed with reference to movement longitudinally thereof, a member at the free end of said spindle in abutting relation therewith in a plane disposed perpendicularly to the axis of said spindle, means for securing said member to said flange and arranged to restrain movement between said member and said flange longitudinally of said spindle, a shaft journaled partly in said spindle and partly in said member forming a driving connection therebetween, the axis of said shaft lying in the aforesaid plane disposed perpendicularly to the axis of said spindle, a tool head supported by said member, and gearing operatively connecting said shaft and said tool head.

7. In combination, a spindle mechanism of the character described comprising a spindle arranged for rotation about its axis, said spindle including a free end, an attachment flange on the free end of said spindle fixed with reference to movement longitudinally thereof, a member at the free end of said spindle in abutting relation therewith in a plane disposed perpendicularly to the axis of said spindle, means for securing said member to said flange and arranged to restrain movement between said member and said flange longitudinally of said spindle, a shaft journaled partly in said spindle and partly in said member forming a driving connection therebetween, the axis of said shaft lying in the aforesaid plane disposed perpendicularly to the axis of said spindle, a tool head supported by said member, gearing operatively connecting said shaft and said tool head, and means for restraining movement of said shaft about its axis during rotation of said spindle.

8. In combination, a spindle mechanism of the character described comprising a housing provided with bearings adjacent its ends, a spindle rotatably mounted in said bearings and having one end bifurcated, a tool head pivotally supported by the forks of said spindle, mechanism for rotating the tool head including a gear mounted on the end of said spindle remote from said tool head, a case for said gear, a cover for said case provided with an aperture, a feed control pin for said aperture, gearing associated with said pin and said tool head for automatically rotating said tool head about its pivot, and manually operable means extending exteriorly of said case arranged to rotate said tool head about its pivot independent of the rotation of said spindle.

ALLEN C. SECOR.